(12) United States Patent
Li et al.

(10) Patent No.: US 12,452,351 B2
(45) Date of Patent: Oct. 21, 2025

(54) TERMINAL DEVICE

(71) Applicant: ZTE Corporation, Shenzhen (CN)

(72) Inventors: Xipeng Li, Shenzhen (CN); Xiaoliang Zhang, Shenzhen (CN); Meijuan Shen, Shenzhen (CN); Lina Qi, Shenzhen (CN); Wei Huang, Shenzhen (CN)

(73) Assignee: BEIJING XINGYUN DIGITAL TECHNOLOGY CO., LTD., Beijing (CN)

( * ) Notice: Subject to any disclaimer, the term of this patent is extended or adjusted under 35 U.S.C. 154(b) by 201 days.

(21) Appl. No.: 18/039,769

(22) PCT Filed: Nov. 1, 2021

(86) PCT No.: PCT/CN2021/127978
§ 371 (c)(1),
(2) Date: Jun. 1, 2023

(87) PCT Pub. No.: WO2022/142704
PCT Pub. Date: Jul. 7, 2022

(65) Prior Publication Data
US 2024/0098166 A1   Mar. 21, 2024

(30) Foreign Application Priority Data
Dec. 31, 2020 (CN) .......................... 202011626314.4

(51) Int. Cl.
*G06F 1/16* (2006.01)
*H04M 1/02* (2006.01)
(Continued)

(52) U.S. Cl.
CPC ........ *H04M 1/0266* (2013.01); *G06F 1/1686* (2013.01); *H04M 1/0264* (2013.01); *H04N 23/55* (2023.01); *H10K 59/65* (2023.02)

(58) Field of Classification Search
CPC ..................................................... G06F 1/1686
See application file for complete search history.

(56) References Cited

U.S. PATENT DOCUMENTS

2020/0244787 A1   7/2020   Gu et al.
2024/0180007 A1*  5/2024   Zhang ................... H10K 59/65

FOREIGN PATENT DOCUMENTS

CN   108376019 A   8/2018
CN   108600453 A   9/2018
(Continued)

OTHER PUBLICATIONS

International Search Report for corresponding application PCT/CN2021/127978 filed Nov. 1, 2021; Mail date Feb. 9, 2022.
(Continued)

*Primary Examiner* — Adrian S Wilson
(74) *Attorney, Agent, or Firm* — Frank Gao, Esq.

(57) ABSTRACT

Provided is a terminal device, which includes: a light-emitting layer and a cover plate, camera unit; the light-emitting layer includes a first light-emitting layer and a second light-emitting layer; when the first light-emitting layer is located at a first preset position, a first orthographic projection area of the first light-emitting layer in a first direction coincides with a second orthographic projection area of the camera unit, wherein the first direction a direction pointing from the light-emitting layer to the cover plate; and when the first light-emitting layer is located at a second preset position, a third orthographic projection area of the light-emitting layer does not coincide with at least part of the second orthographic projection area.

17 Claims, 8 Drawing Sheets

(51) Int. Cl.
*H04N 23/55* (2023.01)
*H10K 59/65* (2023.01)

(56) References Cited

FOREIGN PATENT DOCUMENTS

| | | |
|---|---|---|
| CN | 108683757 A | 10/2018 |
| CN | 109743430 A | 5/2019 |
| CN | 209046692 U | 6/2019 |
| CN | 110109575 A | 8/2019 |
| CN | 209419663 U | 9/2019 |
| CN | 110675754 A | 1/2020 |
| CN | 111029381 A | 4/2020 |
| CN | 111654566 A | 9/2020 |
| CN | 211654165 U | 10/2020 |

OTHER PUBLICATIONS

European Search Report for corresponding application EP21913448; Mail date Apr. 30, 2024.
China Issue Notice dated May 19, 2025; Appln. No. 202011626314.4 * English Translation not available *.
Japanese Office Action dated Apr. 22, 2025; Appln. No. 2023-530255 * English Translation not available *.

* cited by examiner

TERMINAL DEVICE

CROSS-REFERENCE TO RELATED APPLICATION

The present disclosure is based on the Chinese Patent Application 202011626314.4, filed on Dec. 31, 2020, and claims the priority of the Chinese Patent Application, and the entire contents of the Chinese Patent Application are herein incorporated into the present disclosure by reference.

TECHNICAL FIELD

Embodiments of the present disclosure relate to the technical field of display, and in particular to a terminal device.

BACKGROUND

An OLED (Organic Light-Emitting Diode) is referred to as an organic electroluminescent diode. The OLED display technology has the advantages of all solid state, active light emission, high contrast, ultra-thinness, low power consumption, high effect speed, wide working range, easy implementation of flexible display and 3D display, and the like, so that the OLED display technology is applied to numerous display devices at present, for example, being applied to televisions and mobile devices. With the technological progress and the increase in the requirements of consumers for large-screen mobile phones, mobile phone manufacturers always work to improve the screen-to-body ratios of the mobile phones, from the design of so-called frameless mobile phones to fringe screens, from water drop screens to lifting cameras, and the push-out of folding screens, the development trend of the mobile phones toward true full-screens is relatively clear, and the under-screen camera technology is considered to be a killer-level solution of the true full-screens.

However, the inventor finds the following problems: a display area above an under-screen camera has pixels, so that the transmittance of the area is affected, thereby resulting in an insufficient light input of the under-screen camera, and thus front-photographing imaging is not clear.

SUMMARY

The embodiments of the present disclosure provide a terminal device, including:

a light-emitting layer and a cover plate, which are sequentially stacked, wherein the terminal device further includes a camera unit, and the camera unit and the light-emitting layer are located on the same side of the cover plate; the light-emitting layer includes a first light-emitting layer and a second light-emitting layer, and the first light-emitting layer may move from a first preset position to a second preset position; when the first light-emitting layer is located at the first preset position, a first orthographic projection area of the first light-emitting layer in a first direction coincides with a second orthographic projection area of the camera unit in the first direction, wherein the first direction is a stacking direction of the light-emitting layer and the cover plate; and when the first light-emitting layer is located at the second preset position, a third orthographic projection area of the light-emitting layer in the first direction does not coincide with at least part of the second orthographic projection area, or, when the first light-emitting layer is located at the second preset position, the orthographic projection area of the first light-emitting layer on the cover plate does not coincide with at least part of the second orthographic projection area, the second light-emitting layer includes a first light-emitting sub-layer and a second light-emitting sub-layer that directly faces the second orthographic projection area, and the pixel density of the second light-emitting sub-layer is less than the pixel density of the first light-emitting sub-layer.

BRIEF DESCRIPTION OF THE DRAWINGS

One or more embodiments are exemplarily illustrated by way of pictures in the drawings corresponding thereto, these exemplary illustrations do not constitute limitations on the embodiments, elements having the same reference signs in the drawings are represented as similar elements, and unless in an embodiment stated, the figures in the drawings do not constitute scale limitations.

DETAILED DESCRIPTION OF THE EMBODIMENTS

Figure 1:
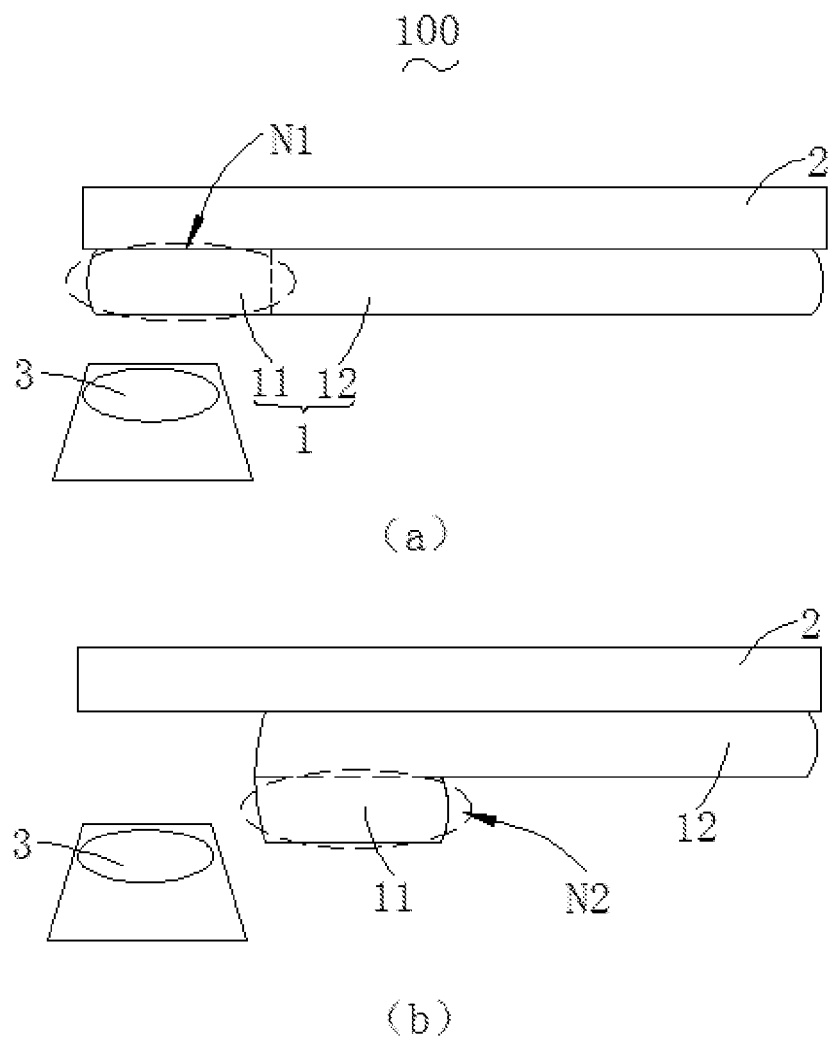
FIG. 1 is a schematic structural diagram of a terminal device according to a first embodiment of the present disclosure.

At present, a photosensitive module such as a camera in a terminal product needs to be placed below a screen, but a light-emitting material layer is disposed below the existing screen, resulting in a relatively low light transmittance of the terminal product. When the photosensitive module such as the camera collects an external optical signal, the screen cannot ensure sufficient light to penetrate through the screen body, such that the photosensitive module such as the camera is difficult to collect sufficient light, and thus the photographing performance of the photosensitive module such as the camera is affected.

In view of the above problems, the present disclosure provides a terminal device, wherein when a first light-emitting layer thereof is located at a first preset position, a first orthographic projection area of the first light-emitting layer on a cover plate coincides with a second orthographic projection area of a camera unit on the cover plate; when the first light-emitting layer is located at a second preset position, a third orthographic projection area of the light-emitting layer on the cover plate does not coincide with at least part of the second orthographic projection area, or, the orthographic projection area of the first light-emitting layer on the cover plate does not coincide with at least part of the second orthographic projection area, a second light-emitting layer includes a first light-emitting sub-layer and a second light-emitting sub-layer that directly faces the second orthographic projection area, and the pixel density of the second light-emitting sub-layer is less than the pixel density of the first light-emitting sub-layer. The photographing performance can be improved without affecting the display effect of the screen.

In the description of the present disclosure, it should be understood that orientation or position relationships indicated by terms "center", "longitudinal", "transverse", "length", "width", "thickness", "upper", "lower", "front", "back", "left", "right", "vertical", "horizontal", "top", "bottom", "inside", "outside", "clockwise", "counterclockwise" and the like are orientation or position relationships shown on the basis of the drawings, and are merely for the convenience of describing the present disclosure and simplifying the description, but do not indicate or imply that the referred apparatuses or elements must have specific orientations or must be constructed and operated in specific orientations, and thus cannot be construed as limitations to the present disclosure.

The terms "first" and "second" are used for descriptive purposes only and cannot be understood as indicating or implying relative importance or implicitly indicating the number of indicated technical features. Thus, features defined with "first" and "second" may explicitly or implicitly include one or more of the features. In the description of the present disclosure, "a plurality of" means two or more, unless in an embodiment defined otherwise.

The terms "installed", "connected" and "connection" should be understood in a broad sense, for example, the connection may be a fixed connection, and may also be a detachable connection, or an integral connection; may be a mechanical connection, and may also be an electrical connection or mutual communication; and may be a direct connection, may be an indirect connection through an intermediate medium, and may also be internal communication between two elements or an interaction relationship between the two elements. For those ordinary skilled in the art, the specific meanings of the above terms in the present disclosure may be understood according to specific situations.

In order to make the objectives, technical solutions and advantages of the embodiments of the present disclosure clearer, various embodiments of the present disclosure will be described in detail below in combination with the drawings. However, those ordinary skilled in the art may understand that, in the various embodiments of the present disclosure, many technical details are set forth in order to make readers better understand the present disclosure. However, the technical solutions claimed in the present disclosure may also be implemented even without these technical details and various changes and modifications based on the following embodiments.

A first embodiment of the present disclosure relates to a terminal device 100, the schematic structural diagram of the terminal device 100 in the present embodiment is shown in FIG. 1, and the terminal device 100 includes:

a light-emitting layer 1 and a cover plate 2, which are sequentially stacked, wherein the terminal device 100 further includes a camera unit 3, and the camera unit 3 and the light-emitting layer 1 are located on the same side of the cover plate 2; the light-emitting layer 1 includes a first light-emitting layer 11 and a second light-emitting layer 12, and the first light-emitting layer 11 may move from a first preset position N1 to a second preset position N2; when the first light-emitting layer 11 is located at the first preset position N1, and in a direction pointing from the light-emitting layer 1 to the cover plate 2, a first orthographic projection area of the first light-emitting layer 11 coincides with a second orthographic projection area of the camera unit 3; and when the first light-emitting layer 11 is located at the second preset position N2, in the direction pointing from the light-emitting layer 1 to the cover plate 2, a third orthographic projection area of the light-emitting layer 1 does not coincide with at least part of the second orthographic projection area.

In practical applications, the light-emitting layer 1 includes a buffer layer, an N-GaN layer (an N-type gallium nitride layer), a multi-quantum well layer, a P-GaN layer (a P-type gallium nitride layer) and an ITO layer (an indium tin oxide layer), which are sequentially stacked. In addition, the cover plate 2 in the present embodiment is a glass cover plate.

The embodiment of the present disclosure at least has the following advantages: by means of setting the movable first light-emitting layer 11, when the terminal device 100 is in a display state, the first light-emitting layer 11 is moved to the first preset position N1, at this time, the first orthographic projection area of the first light-emitting layer 11 on the cover plate 2 coincides with the second orthographic projection area of the camera unit 3 on the cover plate 2, that is, an area above the camera unit 3 is provided with the light-emitting layer for display, thereby realizing full-screen display of the terminal device 100, and thus improving the display effect of the terminal device 100; and when the terminal device 100 is in a photographing state, the first light-emitting layer 11 is moved to the second preset position N2, at this time, the third orthographic projection area of the light-emitting layer 1 on the cover plate 2 does not coincide with at least part of the second orthographic projection area, that is, when the terminal device 100 is in the photographing state, at least part of the area above the camera unit 3 is not provided with the light-emitting layer 1, so that the light-emitting layer 1 can be effectively prevented from blocking external light from entering the camera unit 3, the light transmittance is thus improved, and accordingly, the photographing performance of the camera unit is improved while the terminal device 100 meets full-screen display.

Please still refer to FIG. 1a and FIG. 1b, the first light-emitting layer 11 and the second light-emitting layer 12 are disposed on the same layer in the present embodiment: as shown in FIG. 1a, the camera unit 3 is in a dormant state, and the light-emitting layer 1 above the camera unit 3 is in a normal unfolded state, therefore complete visual image content can be displayed; as shown in FIG. 1b, the camera unit 3 is in a working state, and a physical bending operation is performed on the light-emitting layer 1 above the camera (the first light-emitting layer 11 is bent to coincide with the second light-emitting layer 12), so that the area above the camera unit 3 is not shielded by the light-emitting layer 1, and accordingly, the camera unit 3 may receive more light, so as to better perform lens imaging. It is worth mentioning that, when the light-emitting layer 1 is in a bent state, the screen display of the bent area may be incomplete, at this time, the terminal device 100 may perform special processing according to the current display content, for example, perform shortening and displacement operations and the like on a status bar area, thereby improving the user experience.

It is worth mentioning that, the terminal device 100 in the present embodiment has a driving control unit (not shown in the figure), and the unit may control the light-emitting layer 1 to be in an unfolded state or in a bent state. Further, when the driving control unit controls the light-emitting layer 1 to be in the bent state, there is no need to bend the first light-emitting layer 11 by approximately 180 degrees as shown in FIG. 1*b*, so as to coincide with the second light-emitting layer 12, and it is only necessary to ensure that the first light-emitting layer 11 is bent to not shield or only partially shield a light path of the camera unit 3.

Figure 2:
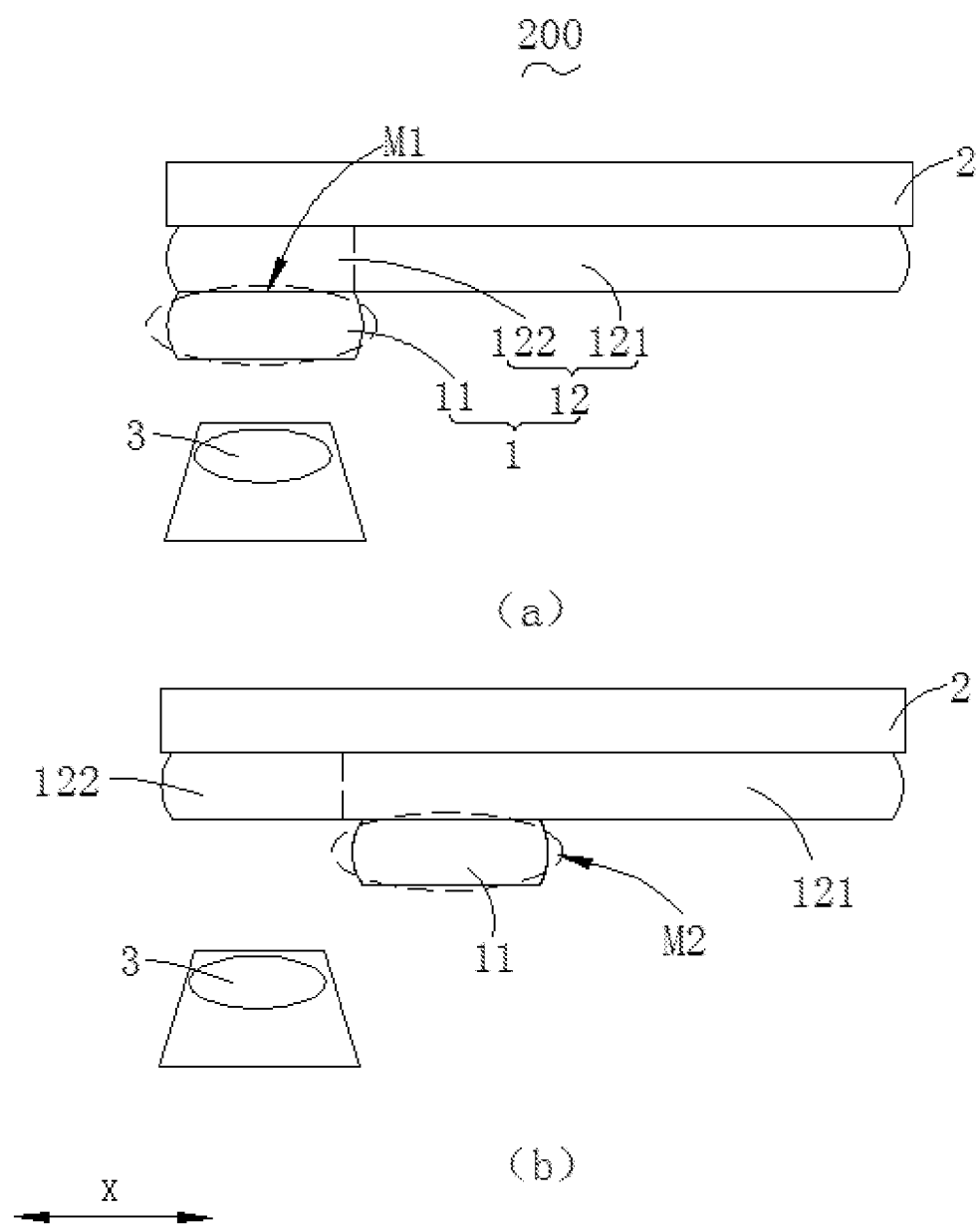
FIG. 2 is a schematic structural diagram of a terminal device according to a second embodiment of the present disclosure.

A second embodiment of the present disclosure relates to a terminal device 200, the present embodiment is approximately the same as the first embodiment, and the main difference lies in that: in the present embodiment, as shown in FIG. 2, the first light-emitting layer 11 may move from a first preset position M1 to a second preset position M2 in a first direction X, wherein the first direction X is a direction perpendicular to the stacking direction of the light-emitting layer 1 and the cover plate 2; when the first light-emitting layer 11 is located at the first preset position M1, the first light-emitting layer 11 is disposed between the second light-emitting layer 12 and the camera unit 3; and when the first light-emitting layer 11 is located at the second preset position M2, the orthographic projection area of the first light-emitting layer 11 on the cover plate 2 does not coincide with at least part of the second orthographic projection area, the second light-emitting layer 12 includes a first light-emitting sub-layer 121 and a second light-emitting sub-layer 122 that directly faces the second orthographic projection area, and the pixel density of the second light-emitting sub-layer 122 is less than the pixel density of the first light-emitting sub-layer 121.

Figure 3:
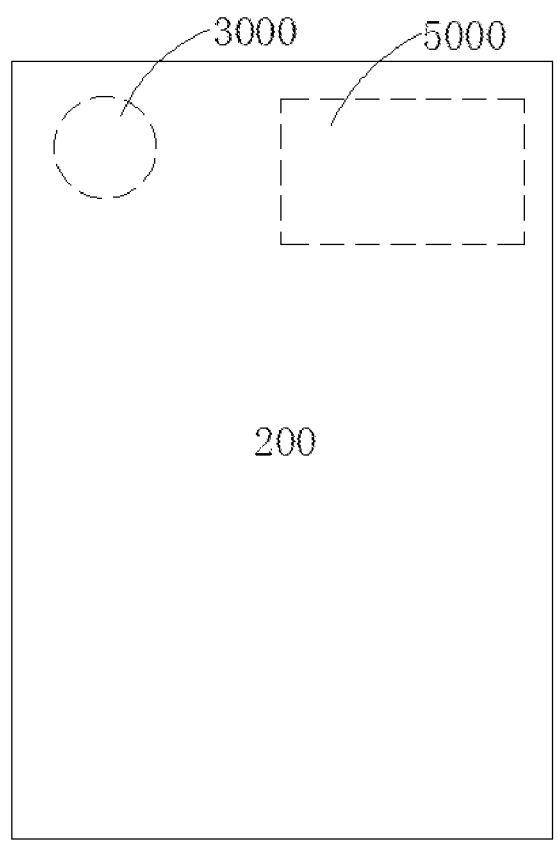
FIG. 3 is a schematic structural diagram of a terminal device and a control unit according to the second embodiment of the present disclosure.
Figure 3:
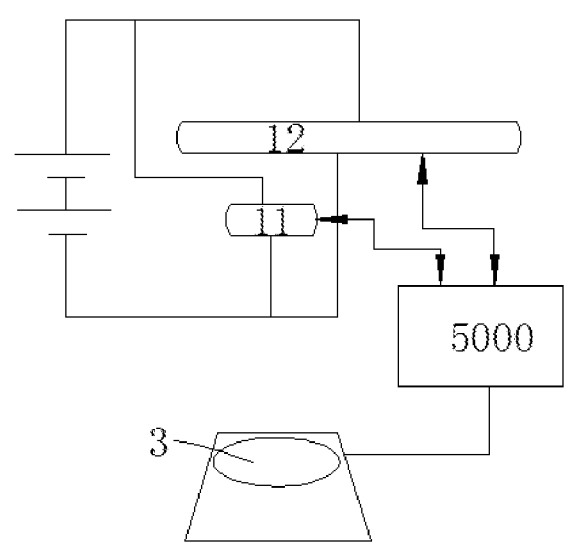

In an embodiment, in the present embodiment, the first light-emitting layer 11 and the second light-emitting layer 12 are not disposed on the same layer, the first light-emitting layer 11 is disposed on the side of the second light-emitting layer 12 that is away from a substrate 1, and the first light-emitting layer 11 may move between the first preset position M1 and the second preset position M2 in the first direction X (the first light-emitting layer 11 may just move to the first preset position M1 or the second preset position M2). As shown in FIG. 2*a*, the camera unit 3 is in the dormant state, and the light-emitting layer 1 above the camera unit 3 is in the normal unfolded state, so that complete visual image content can be displayed; as shown in FIG. 2*b*, the camera unit 3 is in the working state, and a translation operation is performed on the first light-emitting layer 11 above the camera (the first light-emitting layer 11 is moved to a light path away from the camera unit 3), so that the area above the camera unit 3 is not shielded by the first light-emitting layer 11 (or only partially shielded by the first light-emitting layer 11), and accordingly, the camera unit 3 may receive more light, so as to better perform lens imaging. For ease of understanding, how to run the terminal device 200 in the present embodiment is in an embodiment described below in combination with FIG. 3.

As shown in FIG. 3*a*, it is a schematic structural diagram of the terminal device 200. A dotted line circle 3000 indicates the installation position of the camera unit 3, a dotted line box 5000 indicates a control unit, the control unit may comprehensively control and process components such as the first light-emitting layer 11, the second light-emitting layer 12 and the camera unit 3, so as to improve the application experience of the under-screen camera technology through a combined control method. As shown in FIG. 3*b*, it is a schematic structural diagram of a control unit 5000. The control unit 5000 may collect and process circuit information of components such as the first light-emitting layer 11, the second light-emitting layer 12 and the camera unit 3, transmit the circuit information to a main processing unit of the terminal device 200 for judgement processing, and perform various components and display or function processing according to an instruction issued by the main processing unit. In an embodiment, when the camera unit 3 is in the dormant state, the control unit 5000 controls the first light-emitting layer 11 to locate at the first preset position M1, and controls the first light-emitting layer 11 and the second light-emitting layer 12 to emit light, so as to ensure the display effect of the terminal device 200; and when the camera unit 3 is in the working state, the control unit 5000 controls the first light-emitting layer 11 to locate at the second preset position M2, and controls the second light-emitting layer 12 to emit light and the first light-emitting layer 11 to not emit light, so as to facilitate the maximum light input and imaging processing of the under-screen camera unit 3.

It is worth mentioning that, the motion mode of the first light-emitting layer 11 is not in an embodiment defined in the present embodiment, for example, the first light-emitting layer 11 may move in an X direction through a sliding rail and the like, and other structures capable of causing the first light-emitting layer 11 to move between the first preset position M1 and the second preset position M2 in the first direction X are all within the protection scope of the present embodiment, and may be set according to actual requirements.

Figure 4:
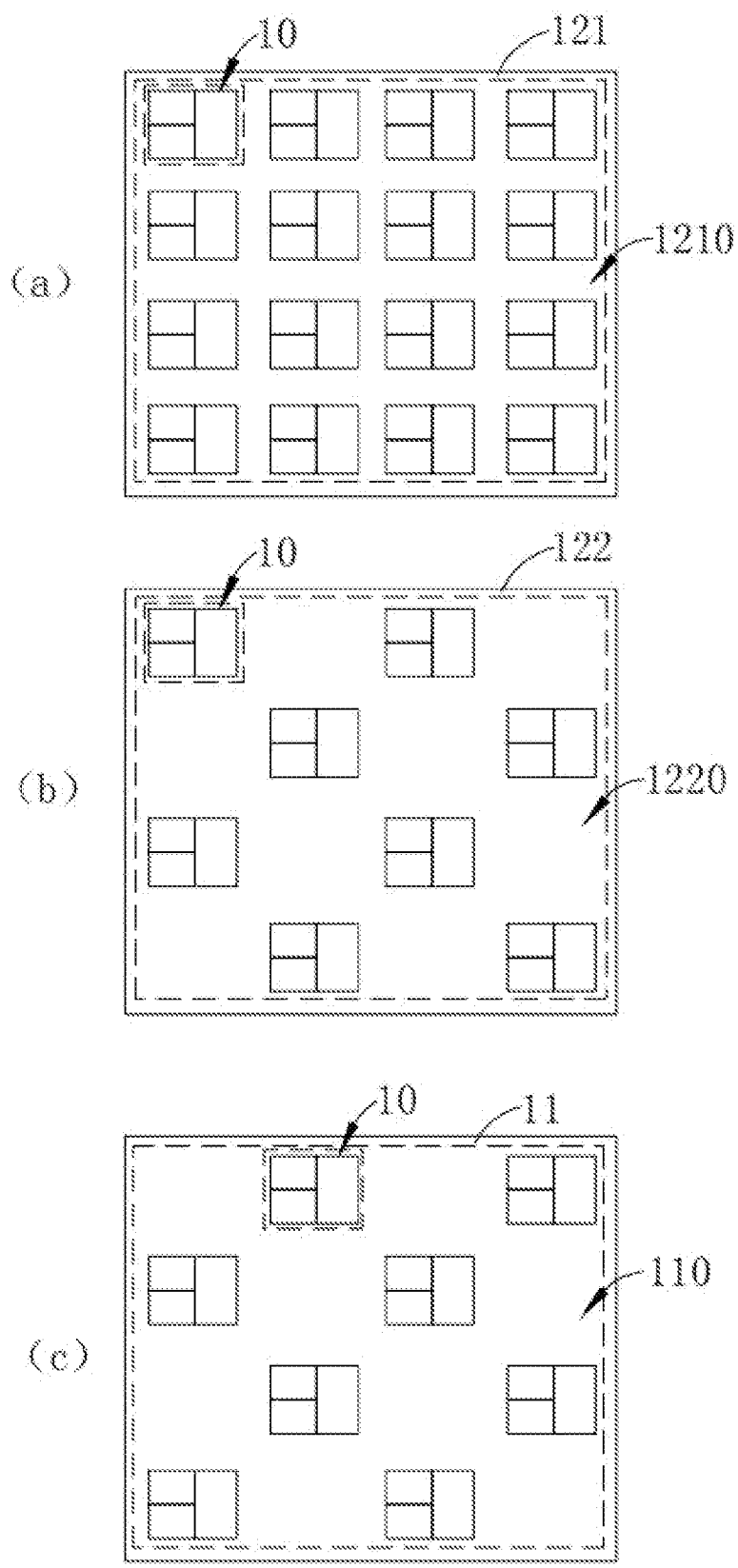
FIG. 4 is a schematic structural diagram of a first pixel structure to a third pixel structure according to the second embodiment of the present disclosure.

Please refer to FIG. 4, since the display effect of a terminal display area above the camera unit 3 is an superimposed display effect of the first light-emitting layer 11 and the second light-emitting sub-layer 122, in order to ensure that the display effect of the terminal display effect above the camera unit 3 is consistent with the display effect of other display areas of the terminal device 200, in the present embodiment, the pixel distribution of the first light-emitting layer 11 and the second light-emitting sub-layer 122 is specially processed, so as to further improve the display effect of the terminal device 200. In an embodiment, as shown in FIG. 4*a*, the first light-emitting sub-layer 121 has a first pixel structure 1210, as shown in FIG. 4*b*, the second light-emitting sub-layer 122 has a second pixel structure 1220, and as shown in FIG. 4*c*, the first light-emitting layer 11 has a third pixel structure 110. When the first light-emitting layer 11 is located at the first preset position M1, an orthographic projection pattern of the first pixel structure 1210 on the cover plate 2 is a first pattern, the orthographic projection pattern of the second pixel structure 1220 on the cover plate 2 is a second pattern, the orthographic projection pattern of the third pixel structure 110 on the cover plate 2 is a third pattern, and a pattern shape that is formed after the second pattern is superposed with the third pattern is the same as the pattern shape of the first pattern.

More in an embodiment, the first pixel structure 1210 includes a plurality of pixel groups 10 disposed in an array, each pixel group 10 includes a red sub-pixel, a green sub-pixel and a blue sub-pixel. As shown in FIG. 4*a*, the first pixel structure 1210 has 16 pixel groups in total, and each row and each column have 4 pixel groups respectively. As shown in FIG. 4*b*, the second pixel structure 1220 has 8 pixel groups in total, and two pixel groups in the previous row and two pixel groups in the next row are disposed in a staggered manner. As shown in FIG. 4*c*, the third pixel structure 110 has 8 pixel groups in total, two pixel groups in the previous row and two pixel groups in the next row are disposed in the staggered manner, and the arrangement positions of the two pixel groups in the first row are the same as the arrangement positions of the two pixel groups in the second row of the second pixel structure 1220. It can be understood that, by means of the above structure settings, the pattern shape that is formed after the second pattern S2 is superposed with the third pattern S3 is the same as the pattern shape of the first pattern S1, that is, the second pixel structure 1220 and the first pixel structure 1210 may be superimposed to form the third pixel structure 110, so as to ensure that the display effect of the terminal display area above the camera unit 3 is consistent with the display effect of other display areas of the terminal device 200.

It can be understood that, the pixel arrangement structure of the first light-emitting layer 11, the first light-emitting sub-layer 121 and the second light-emitting sub-layer 122 shown in FIG. 4 is merely a feasible pixel arrangement mode, and in practical applications, other pixel arrangement structures may be set according to actual requirements, and it is only necessary to ensure that the pattern shape that is formed after the second pattern is superposed with the third pattern is the same as or approximately the same as the pattern shape of the first pattern, and the pixel arrangement modes of the first pixel structure 1210, the second pixel structure 1220 and the third pixel structure 110 are not in an embodiment defined in the present embodiment.

It is worth noting that, the sum of the pixel density of the first light-emitting layer 11 and the pixel density of the second light-emitting sub-layer 122 shown in FIG. 4 is equal to the pixel density of the first light-emitting sub-layer 121, and the pixel density of the first light-emitting layer 11 is equal to the pixel density of the second light-emitting sub-layer 122. In practical applications, the ratio of the pixel density of the first light-emitting layer 11 to the pixel density of the second light-emitting sub-layer 122 is between 1 and 4, and may be set according to actual requirements. The setting of this ratio range may reduce the pixel density of the second light-emitting sub-layer 122 as much as possible while ensuring that the second light-emitting sub-layer 122 has a certain display effect, so as to improve the photographing effect of the camera unit 3. Preferably, the ratio of the pixel density of the first light-emitting layer 11 to the pixel density of the second light-emitting sub-layer 122 is 2.5. Due to this ratio, the display effect of the second light-emitting sub-layer 122 may be better, and the photographing performance of the camera unit 3 may be excellent.

Figure 5:
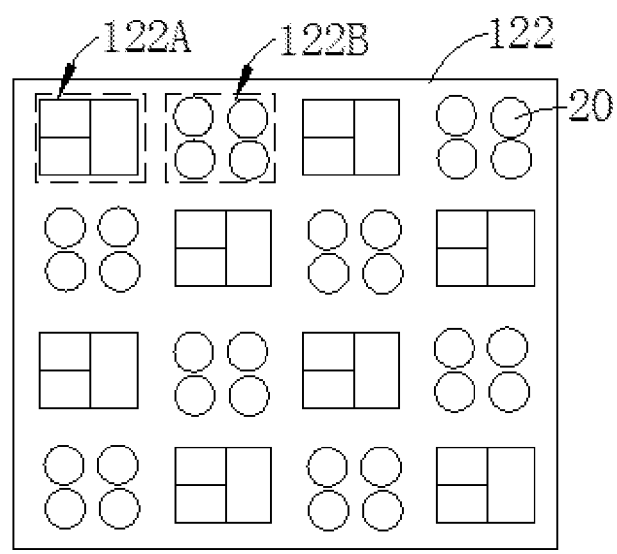
FIG. 5 is a schematic structural diagram of a second light-emitting sub-layer according to the second embodiment of the present disclosure.

Please refer to FIG. 5, the second light-emitting sub-layer 122 includes a plurality of pixel areas 122A and gap areas 122B between adjacent pixel areas 122A. The gap area 122B is provided with a through hole 20 that penetrates through the second light-emitting sub-layer 122. By means of this structure setting, more light can pass through the second light-emitting sub-layer 122 to enter the camera unit 3 without affecting the performance of the second light-emitting sub-layer (compared with an unperforated second light-emitting sub-layer 122, the light may also enter the camera unit 3 from the through hole 20), thereby improving the light input of the camera unit 3.

It should be noted that, each gap area 122B shown in FIG. 5 is provided with four circular through holes 20, and in practical applications, the number of the through holes 20 in each gap area 122B is not in an embodiment defined in the present embodiment and may be set according to actual requirements. In the present embodiment, the shape of the longitudinal section of the through hole 20 is not in an embodiment limited neither, the shape of the longitudinal section of the through hole 20 may be a circle shown in FIG. 5, and may also be an oval, a regular polygon or an irregular pattern or the like, and the shape of the longitudinal section of the through hole 20 is not in an embodiment limited in the present embodiment. It should also be noted that, the size of the through hole 20 is not in an embodiment defined in the present embodiment, and may be freely set according to actual requirements and process difficulty.

In the embodiment of the present disclosure, by means of setting the movable first light-emitting layer 11, when the terminal device 200 is in the display state, the first light-emitting layer 11 is moved to the first preset position M1, at this time, the first orthographic projection area of the first light-emitting layer 11 on the cover plate 2 coincides with the second orthographic projection area of the camera unit 3 on the cover plate, that is, the area above the camera unit 3 is provided with the light-emitting layer for display, thereby realizing full-screen display of the terminal device 100, and thus improving the display effect of the terminal device 100; and when the terminal device 100 is in the photographing state, the first light-emitting layer 11 is moved to the second preset position M2, at this time, the orthographic projection area of the light-emitting layer 1 on the cover plate 2 does not coincide with at least part of the second orthographic projection area, the second light-emitting layer 12 includes the first light-emitting sub-layer 121 and the second light-emitting sub-layer 122 that directly faces the second orthographic projection area, and the pixel density of the second light-emitting sub-layer 122 is less than the pixel density of the first light-emitting sub-layer 121, that is, at least part of the area above the camera unit is not provided with the first light-emitting layer 11 at this time, although the second light-emitting layer 12 has the second light-emitting sub-layer 122 that directly faces the second orthographic projection area, the pixel density of the second light-emitting sub-layer 122 is less than the pixel density of the first light-emitting sub-layer, thereby improving the light transmittance of the second light-emitting sub-layer 122, so that more light may enter the camera unit 3, and thus the photographing performance of the camera unit 3 is improved while enabling the terminal device to meet full-screen display.

Figure 6:
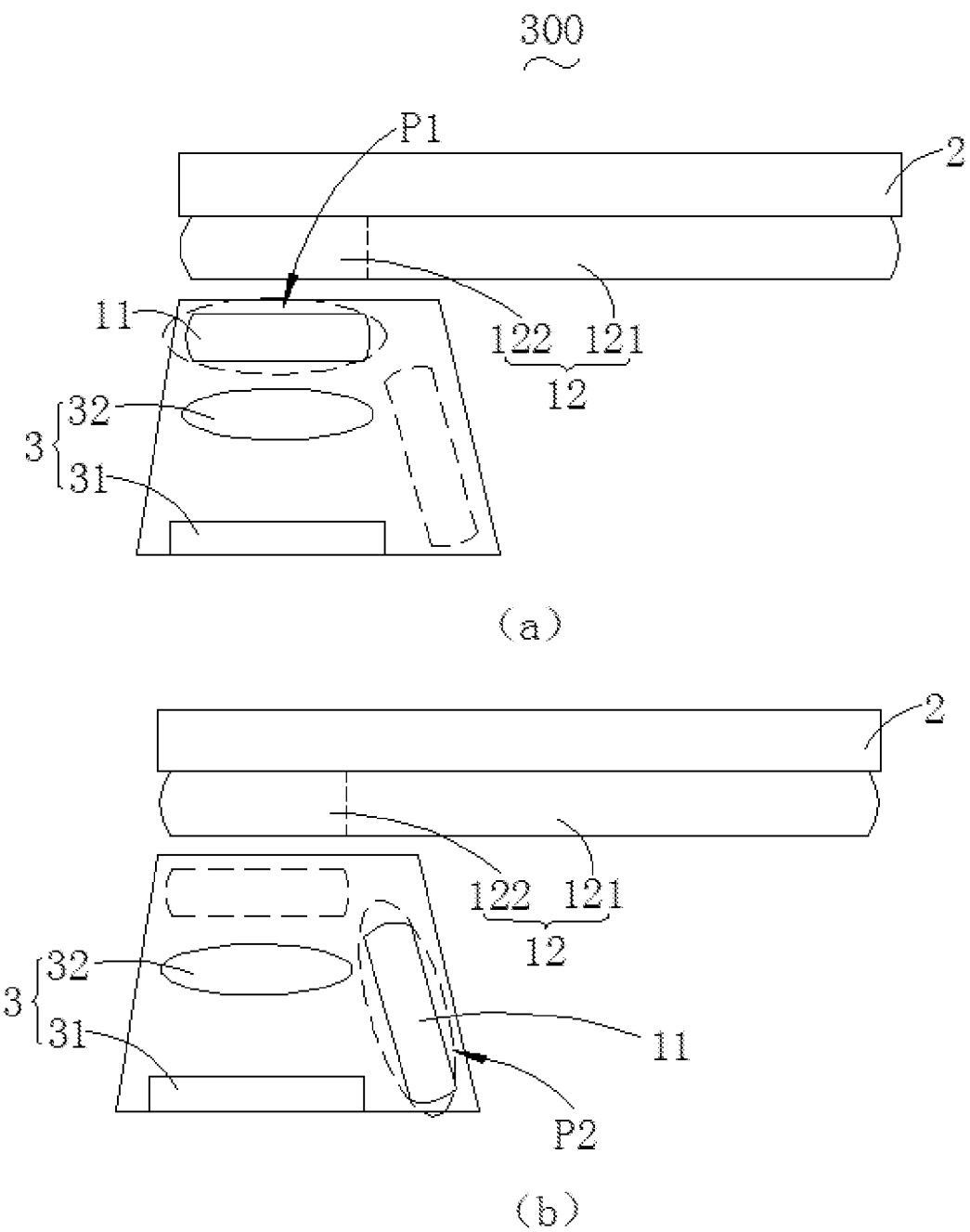
FIG. 6 is a schematic structural diagram of a terminal device according to a third embodiment of the present disclosure.

A third embodiment of the present disclosure relates to a terminal device 300, the present embodiment is approximately the same as the first embodiment, and the main difference lies in that: in the present embodiment, as shown in FIG. 6, the camera unit 3 includes a photosensitive layer 31, and an optical lens 32 disposed on the side of the photosensitive layer 31 that is adjacent to the cover plate 2, and the first light-emitting layer 11 is movably disposed in the camera unit 3; when the first light-emitting layer 11 is located at a first preset position P1, the first light-emitting layer 11 is located on the side of the optical lens 32 that is away from the photosensitive layer 31; and when the first light-emitting layer 11 is located at a second preset position P2, the orthographic projection area of the first light-emitting layer 11 on the cover plate 2 does not coincide with at least part of the second orthographic projection area, the second light-emitting layer 12 includes a first light-emitting sub-layer 121 and a second light-emitting sub-layer 122 that directly faces the second orthographic projection area, and the pixel density of the second light-emitting sub-layer 122 is less than the pixel density of the first light-emitting sub-layer 121.

In an embodiment, in the present embodiment, the first light-emitting layer 11 and the second light-emitting layer 12 are not disposed on the same layer, the first light-emitting layer 11 may be rotated in the camera unit 3 from the first preset position P1 to the second preset position P2. It can be understood that, the motion mode of the first light-emitting layer 11 is not in an embodiment defined in the present embodiment, for example, the first light-emitting layer 11 may be rotated in the camera unit 3 through a rotating shaft, and other structures capable of causing the first light-emitting layer 11 to rotate from the first preset position P1 and the second preset position P2 are all within the protection scope of the present embodiment, and may be set according to actual requirements.

Further, as shown in FIG. 6a, the camera unit 3 is in the dormant state, and the light-emitting layer 1 above the camera unit 3 is in the normal unfolded state, so that complete visual image content can be displayed; as shown in FIG. 6b, the camera unit 3 is in the working state, and a rotation operation is performed on the first light-emitting layer 11 above the camera (the first light-emitting layer 11 is rotated to a light path away from the optical lens 32), so that the area above the optical lens 32 is not shielded by the first light-emitting layer 11 (or only partially shielded by the first light-emitting layer 11), and accordingly, the camera unit 3 may receive more light, so as to better perform lens imaging.

Figure 7:
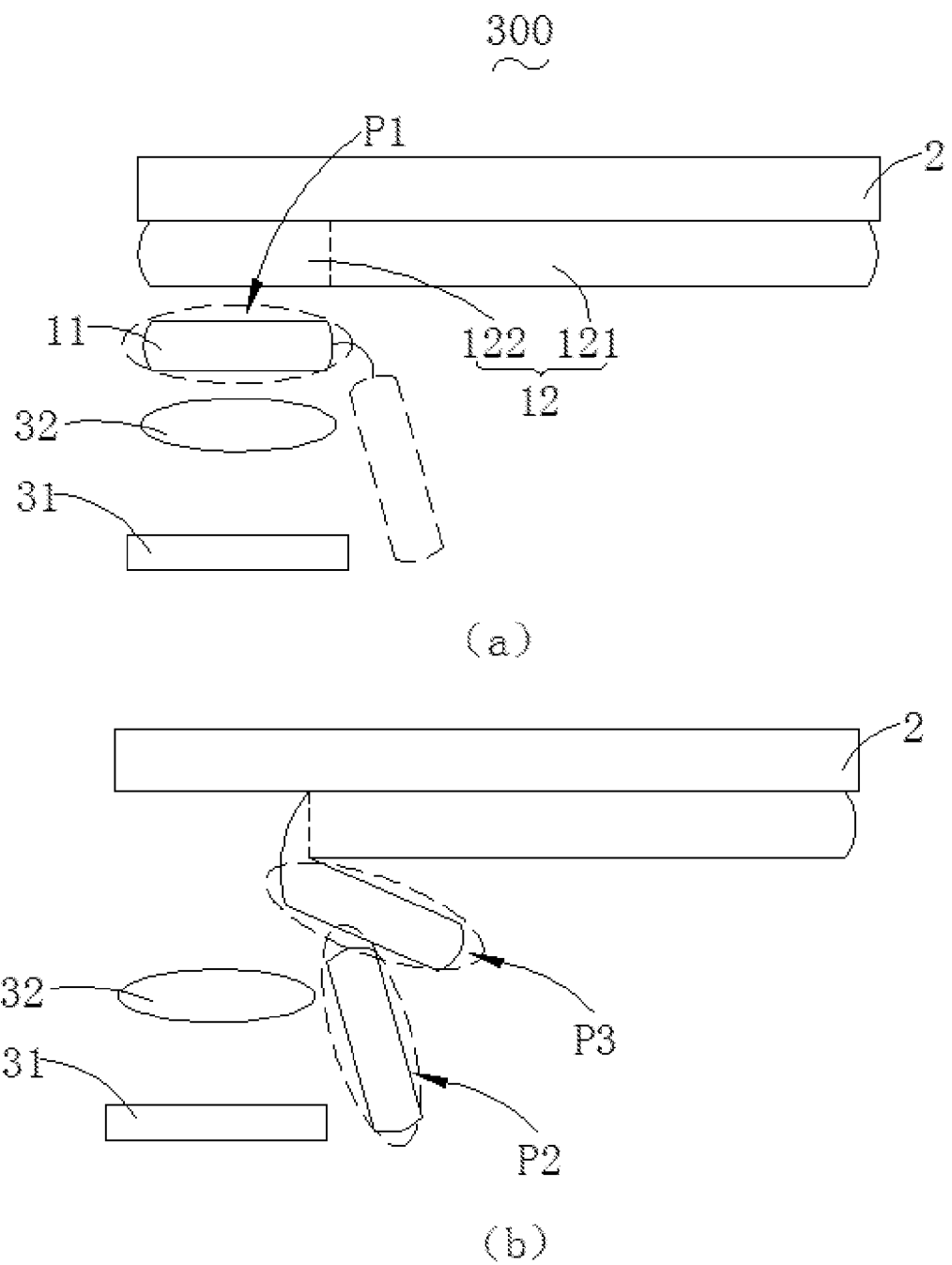
FIG. 7 is a schematic structural diagram of a terminal device of another structure according to the third embodiment of the present disclosure.

As shown in FIG. 7, in another feasible embodiment, the second light-emitting sub-layer 122 is disposed in the camera unit 3, and the first light-emitting sub-layer 121 and the second light-emitting sub-layer 122 are rotatably connected; and when the first light-emitting layer 11 is located at the second preset position P2 and the second light-emitting sub-layer 122 is rotated around the first light-emitting sub-layer 121 to a third preset position P3, the orthographic projection area of the first light-emitting layer 11 on the cover plate does not coincide with at least part of the second orthographic projection area, and the orthographic projection area of the second light-emitting sub-layer 122 on the cover plate 2 does not coincide with at least part of the second orthographic projection area. By means of this structure setting, the light input of the camera unit 3 can be further improved while ensuring the display effect of the terminal device 300, thereby further improving the photographing performance of the camera unit 3.

In an embodiment, as shown in FIG. 7a, the camera unit 3 is in the dormant state, and the light-emitting layer 1 above the camera unit 3 is in the normal unfolded state, so that complete visual image content can be displayed; as shown in FIG. 7b, the camera unit 3 is in the working state, and a rotation operation is performed on the first light-emitting layer 11 and the second light-emitting sub-layer 122 above the camera (the first light-emitting layer 11 and the second light-emitting sub-layer 122 are both rotated to the light path away from the optical lens 32), so that the area above the optical lens 32 is not shielded by the light-emitting layer 1 (or only partially shielded by the light-emitting layer 1), and accordingly, the camera unit 3 may receive more light, so as to better perform lens imaging.

It should be noted that, related technical details mentioned in the first embodiment and the second embodiment are still effective in the present embodiment, and are not repeated herein in order to reduce repetition. Accordingly, the related technical details mentioned in the present embodiment may also be applied to the first embodiment and the second embodiment.

In the embodiment of the present disclosure, by means of setting the movable first light-emitting layer 11, when the terminal device 200 is in the display state, the first light-emitting layer 11 is moved to the first preset position P1, at this time, the first orthographic projection area of the first light-emitting layer 11 on the cover plate 2 coincides with the second orthographic projection area of the camera unit 3 on the cover plate, that is, the area above the camera unit 3 is provided with the light-emitting layer for display, thereby realizing full-screen display of the terminal device 100, and thus improving the display effect of the terminal device 100; and when the terminal device 200 is in the photographing state, the first light-emitting layer 11 is moved to the second preset position M2, at this time, the orthographic projection area of the first light-emitting layer 11 on the cover plate 2 does not coincide with at least part of the second orthographic projection area, the second light-emitting layer 12 includes the first light-emitting sub-layer 121 and the second light-emitting sub-layer 122 that directly faces the second orthographic projection area, and the pixel density of the second light-emitting sub-layer 122 is less than the pixel density of the first light-emitting sub-layer 121, that is, at least part of the area above the camera unit is not provided with the first light-emitting layer 11 at this time, although the second light-emitting layer 12 has the second light-emitting sub-layer 122 that directly faces the second orthographic projection area, the pixel density of the second light-emitting sub-layer 122 is less than the pixel density of the first light-emitting sub-layer, thereby improving the light transmittance of the second light-emitting sub-layer 122, so that more light can enter the camera unit 3, and thus the photographing performance of the camera unit 3 is improved while enabling the terminal device to meet full-screen display.

Figure 8:
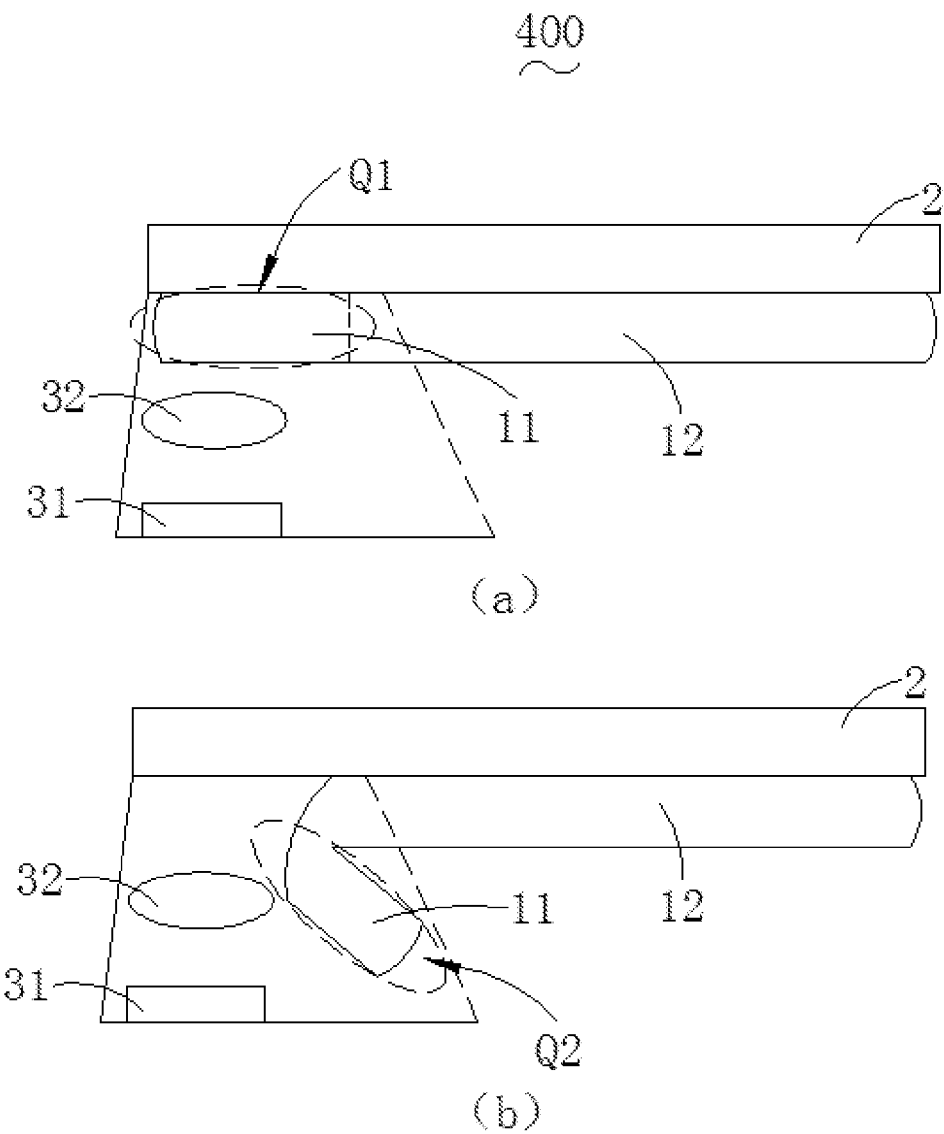
FIG. 8 is a schematic structural diagram of a terminal device according to a fourth embodiment of the present disclosure.

A fourth embodiment of the present disclosure relates to a terminal device 400, the present embodiment is approximately the same as the third embodiment, and the main difference lies in that: in the present embodiment, as shown in FIG. 8, the camera unit 3 includes a photosensitive layer 31, and an optical lens 32 disposed on the side of the photosensitive layer 31 that is adjacent to the cover plate 2, and the first light-emitting layer 11 and the second light-emitting layer 12 are disposed on the same layer; when the first light-emitting layer 11 is located at a first preset position Q1, the first light-emitting layer 11 is located in the camera unit 3 and is located on one side of the optical lens 32 that is away from the photosensitive layer; and when the first light-emitting layer 11 is located at a second preset position Q2, the third orthographic projection area of the light-emitting layer 1 on the cover plate 2 does not coincide with at least part of the second orthographic projection area.

In an embodiment, as shown in FIG. 8a, the camera unit 3 is in the dormant state, and the light-emitting layer 1 above the camera unit 3 is in the normal unfolded state, so that complete visual image content can be displayed; as shown in FIG. 8b, the camera unit 3 is in the working state, and a physical bending operation is performed on the light-emitting layer 1 above the camera (the first light-emitting layer 11 is bent to a side edge of the optical lens 32), so that the area above the optical lens 32 is not shielded by the light-emitting layer 1, and accordingly, the camera unit 3 may receive more light, so as to better perform lens imaging.

It is worth mentioning that, the terminal device 400 in the present embodiment has a driving control unit (not shown in the figure), and the unit may control the light-emitting layer 1 to be in the unfolded state or in the bent state. Further, when the driving control unit controls the first light-emitting layer 11 to be in the bent state, there is no need to bend first light-emitting layer 11 by approximately 90 degrees as shown in FIG. 8b, and it is only necessary to bend the first light-emitting layer 11 to not shield or only partially shield the light path of the optical lens 32.

It should be noted that, related technical details mentioned in the first embodiment, the second embodiment and the third embodiment are still effective in the present embodiment, and are not repeated herein in order to reduce repetition. Correspondingly, the related technical details mentioned in the present embodiment may also be applied to the first embodiment, the second embodiment and the third embodiment.

It can be understood by those ordinary skilled in the art that, the foregoing embodiments are specific embodiments for implementing the present disclosure, and in practical applications, various changes may be made in forms and details without departing from the spirit and scope of the present disclosure.

What is claimed is:

1. A terminal device, comprising: a light-emitting layer and a cover plate, which are sequentially stacked, wherein the terminal device further comprises a camera unit, and the camera unit and the light-emitting layer are located on the same side of the cover plate;
    the light-emitting layer comprises a first light-emitting layer and a second light-emitting layer, and the first light-emitting layer may move from a first preset position to a second preset position;
    upon the condition that the first light-emitting layer is located at the first preset position, a first orthographic projection area of the first light-emitting layer in a first direction coincides with a second orthographic projection area of the camera unit in the first direction, wherein the first direction is a stacking direction of the light-emitting layer and the cover plate; and
    upon the condition that the first light-emitting layer is located at the second preset position, the first orthographic projection area does not coincide with at least part of the second orthographic projection area, the second light-emitting layer comprises a first light-emitting sub-layer and a second light-emitting sub-layer that directly faces the second orthographic projection area, and the pixel density of the second light-emitting sub-layer is less than the pixel density of the first light-emitting sub-layer.

2. The terminal device according to claim 1, wherein the first light-emitting layer may move from the first preset position to the second preset position in a second direction, wherein the second direction is perpendicular to the first direction;
    upon the condition that the first light-emitting layer is located at the first preset position, the first light-emitting layer is disposed between the second light-emitting layer and the camera unit; and
    upon the condition that the first light-emitting layer is located at the second preset position, the first light-emitting layer is at least partially located outside a light path of the camera unit, wherein the direction of the light path is the first direction.

3. The terminal device according to claim 1, wherein the camera unit comprises a photosensitive layer, and an optical lens disposed on the side of the photosensitive layer that is adjacent to the cover plate, and the first light-emitting layer is movably disposed in the camera unit;
    upon the condition that the first light-emitting layer is located at the first preset position, the first light-emitting layer is located on the side of the optical lens that is away from the photosensitive layer; and
    upon the condition that the first light-emitting layer is located at the second preset position, the first light-emitting layer is at least partially located outside the light path of the camera unit, wherein the direction of the light path is the first direction.

4. The terminal device according to claim 3, wherein the second light-emitting sub-layer is disposed in the camera unit, and the first light-emitting sub-layer is rotatably connected with the second light-emitting sub-layer; and
    upon the condition that the first light-emitting layer is located at the second preset position, and the second light-emitting sub-layer is rotated around the first light-emitting sub-layer to a third preset position, both the first light-emitting layer and the second light-emitting sub-layer are at least partially located outside the light path.

5. The terminal device according to claim 2, wherein the second light-emitting sub-layer comprises a plurality of pixel areas and gap areas between adjacent pixel areas, and the gap area is provided with a through hole that penetrates through the second light-emitting sub-layer.

6. The terminal device according to claim 2, wherein the sum of the pixel density of the first light-emitting layer and the pixel density of the second light-emitting sub-layer is equal to the pixel density of the first light-emitting sub-layer.

7. The terminal device according to claim 6, wherein the ratio of the pixel density of the first light-emitting layer to the pixel density of the second light-emitting sub-layer is between 1 and 4.

8. The terminal device according to claim 2, wherein the first light-emitting sub-layer has a first pixel structure, the second light-emitting sub-layer has a second pixel structure, and the first light-emitting layer has a third pixel structure; and upon the condition that the first light-emitting layer is located at the first preset position, an orthographic projection pattern of the first pixel structure on the cover plate is a first pattern, the orthographic projection pattern of the second pixel structure on the cover plate is a second pattern, the orthographic projection pattern of the third pixel structure on the cover plate is a third pattern, and a pattern shape that is formed after the second pattern is superposed with the third pattern is the same as the pattern shape of the first pattern.

9. The terminal device according to claim 3, wherein the second light-emitting sub-layer comprises a plurality of pixel areas and gap areas between adjacent pixel areas, and the gap area is provided with a through hole that penetrates through the second light-emitting sub-layer.

10. The terminal device according to claim 4, wherein the second light-emitting sub-layer comprises a plurality of pixel areas and gap areas between adjacent pixel areas, and the gap area is provided with a through hole that penetrates through the second light-emitting sub-layer.

11. The terminal device according to claim 3, wherein the sum of the pixel density of the first light-emitting layer and the pixel density of the second light-emitting sub-layer is equal to the pixel density of the first light-emitting sub-layer.

12. The terminal device according to claim 4, wherein the sum of the pixel density of the first light-emitting layer and the pixel density of the second light-emitting sub-layer is equal to the pixel density of the first light-emitting sub-layer.

13. The terminal device according to claim 5, wherein the sum of the pixel density of the first light-emitting layer and the pixel density of the second light-emitting sub-layer is equal to the pixel density of the first light-emitting sub-layer.

14. The terminal device according to claim 3, wherein the first light-emitting sub-layer has a first pixel structure, the second light-emitting sub-layer has a second pixel structure, and the first light-emitting layer has a third pixel structure; and upon the condition that the first light-emitting layer is located at the first preset position, an orthographic projection pattern of the first pixel structure on the cover plate is a first pattern, the orthographic projection pattern of the second pixel structure on the cover plate is a second pattern, the orthographic projection pattern of the third pixel structure on the cover plate is a third pattern, and a pattern shape that is formed after the second pattern is superposed with the third pattern is the same as the pattern shape of the first pattern.

15. The terminal device according to claim 4, wherein the first light-emitting sub-layer has a first pixel structure, the second light-emitting sub-layer has a second pixel structure, and the first light-emitting layer has a third pixel structure; and upon the condition that the first light-emitting layer is located at the first preset position, an orthographic projection pattern of the first pixel structure on the cover plate is a first pattern, the orthographic projection pattern of the second pixel structure on the cover plate is a second pattern, the orthographic projection pattern of the third pixel structure on the cover plate is a third pattern, and a pattern shape that is formed after the second pattern is superposed with the third pattern is the same as the pattern shape of the first pattern.

16. The terminal device according to claim 5, wherein the first light-emitting sub-layer has a first pixel structure, the second light-emitting sub-layer has a second pixel structure, and the first light-emitting layer has a third pixel structure; and upon the condition that the first light-emitting layer is located at the first preset position, an orthographic projection pattern of the first pixel structure on the cover plate is a first pattern, the orthographic projection pattern of the second pixel structure on the cover plate is a second pattern, the orthographic projection pattern of the third pixel structure on the cover plate is a third pattern, and a pattern shape that is formed after the second pattern is superposed with the third pattern is the same as the pattern shape of the first pattern.

17. The terminal device according to claim 6, wherein the first light-emitting sub-layer has a first pixel structure, the second light-emitting sub-layer has a second pixel structure, and the first light-emitting layer has a third pixel structure; and upon the condition that the first light-emitting layer is located at the first preset position, an orthographic projection pattern of the first pixel structure on the cover plate is a first pattern, the orthographic projection pattern of the second pixel structure on the cover plate is a second pattern, the orthographic projection pattern of the third pixel structure on the cover plate is a third pattern, and a pattern shape that is formed after the second pattern is superposed with the third pattern is the same as the pattern shape of the first pattern.

* * * * *